United States Patent [19]

Bernal

[11] Patent Number: 4,881,928
[45] Date of Patent: Nov. 21, 1989

[54] CHAIN TENSIONING DEVICE

[76] Inventor: Medardo P. Bernal, 655 Donna Beth Ave., #23, Azusa, Calif. 91702

[21] Appl. No.: 254,929

[22] Filed: Oct. 7, 1988

[51] Int. Cl.$^4$ ............................................. F16H 7/08
[52] U.S. Cl. ..................................... 474/111; 474/91; 474/140
[58] Field of Search ................. 474/109–111, 474/136–138, 140, 101, 113–117, 91; 254/100; 198/837, 841, 814; 184/15.1, 15.2

[56] References Cited

U.S. PATENT DOCUMENTS

| | | | |
|---|---|---|---|
| 2,723,566 | 11/1955 | Hyman | 474/111 |
| 2,766,634 | 10/1956 | Frank | 474/111 X |
| 3,707,092 | 12/1972 | Piech | 474/111 X |
| 4,193,314 | 3/1980 | Horner et al. | 198/841 X |
| 4,492,304 | 1/1985 | Geis | 474/140 X |
| 4,530,681 | 7/1985 | Kurata et al. | 474/111 |
| 4,713,043 | 12/1987 | Biedermann | 474/111 |
| 4,798,562 | 1/1989 | Matson et al. | 474/111 X |

Primary Examiner—Thuy M. Bui
Attorney, Agent, or Firm—Jerry T. Kearns

[57] ABSTRACT

A chain tensioning device includes a pair of spaced blocks having opposed surfaces configured for abutment with a chain. An elongated connecting bar extends between the blocks and through aligned apertures formed through each of the blocks. The blocks are independently adjustably secured along the length of the connecting bar by set screws. The opposed chain abutment surfaces are configured as mirror image rectangular channel tracks having a central projection. In use, the device is placed in engagement with an endless loop type sprocket driven chain and the blocks are adjustably positioned along the length of the connecting bar with the rectangular channel tracks in engagement with opposite sides of the endless chain loop. The device provides a simple and inexpensive mechanism for tensioning a chain in the absence of a supporting structure for mounting an additional idler sprocket. An automatic chain oiling mechanism may be attached to one of the blocks for continuously dispensing small quantities of lubricant on the chain. The chain oiling mechanism includes a support link secured to one of the blocks, a gear rotatably mounted on the support link, an oil reservoir mounted on an end of the support link, an output nozzle on the reservoir, and a valve actuated upon rotation of the gear through engagement with the chain for opening the output nozzle.

6 Claims, 3 Drawing Sheets

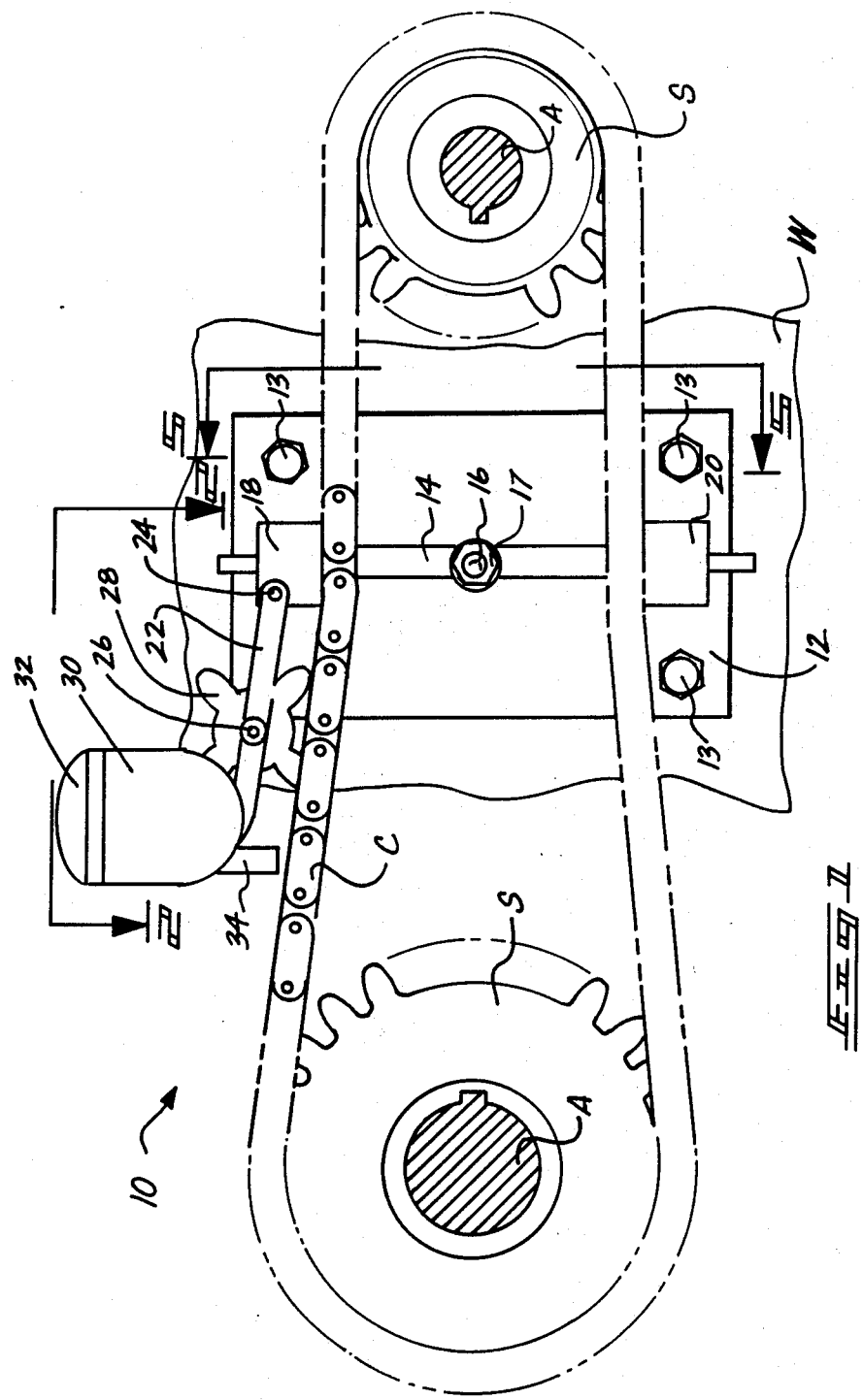

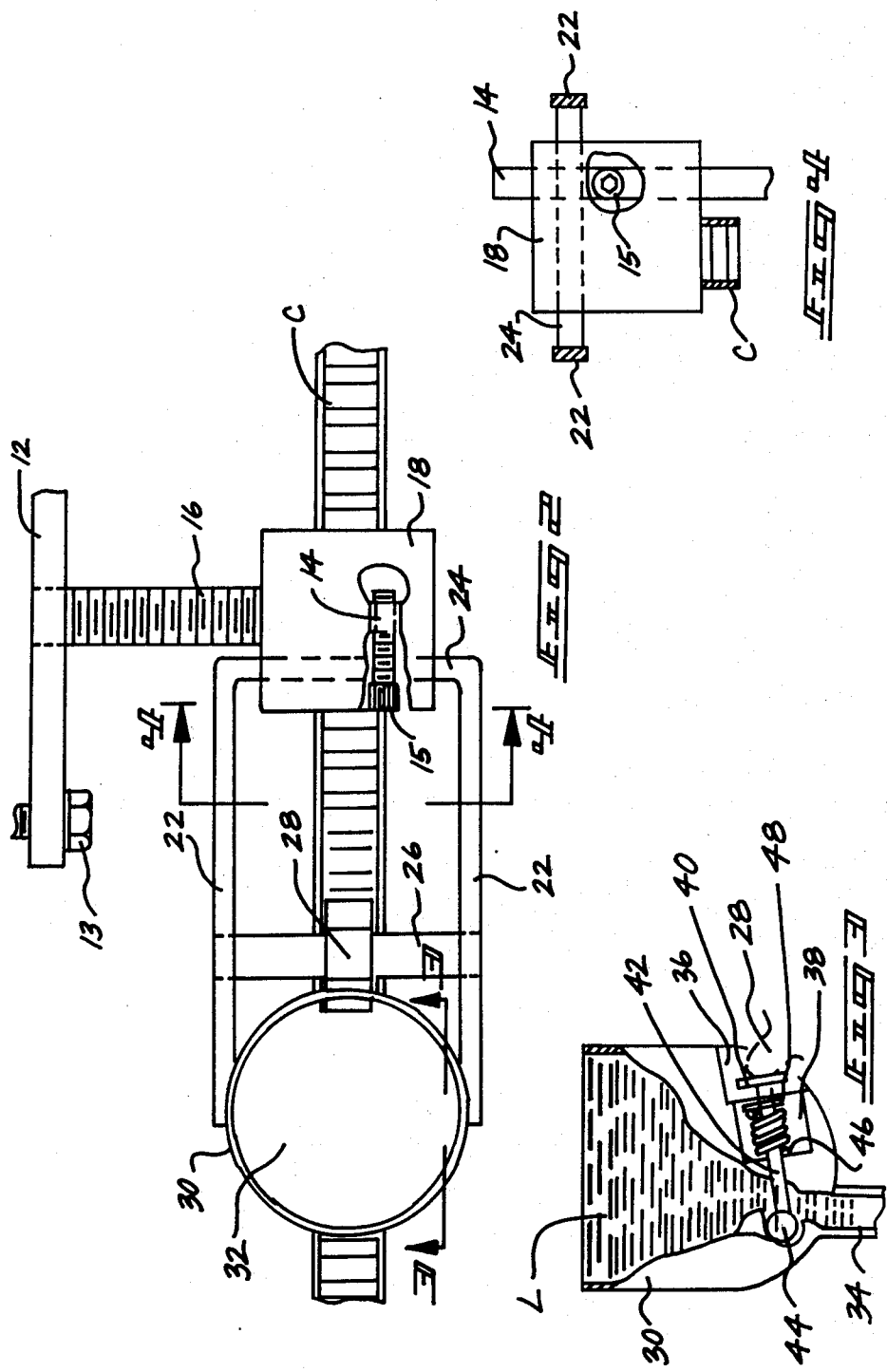

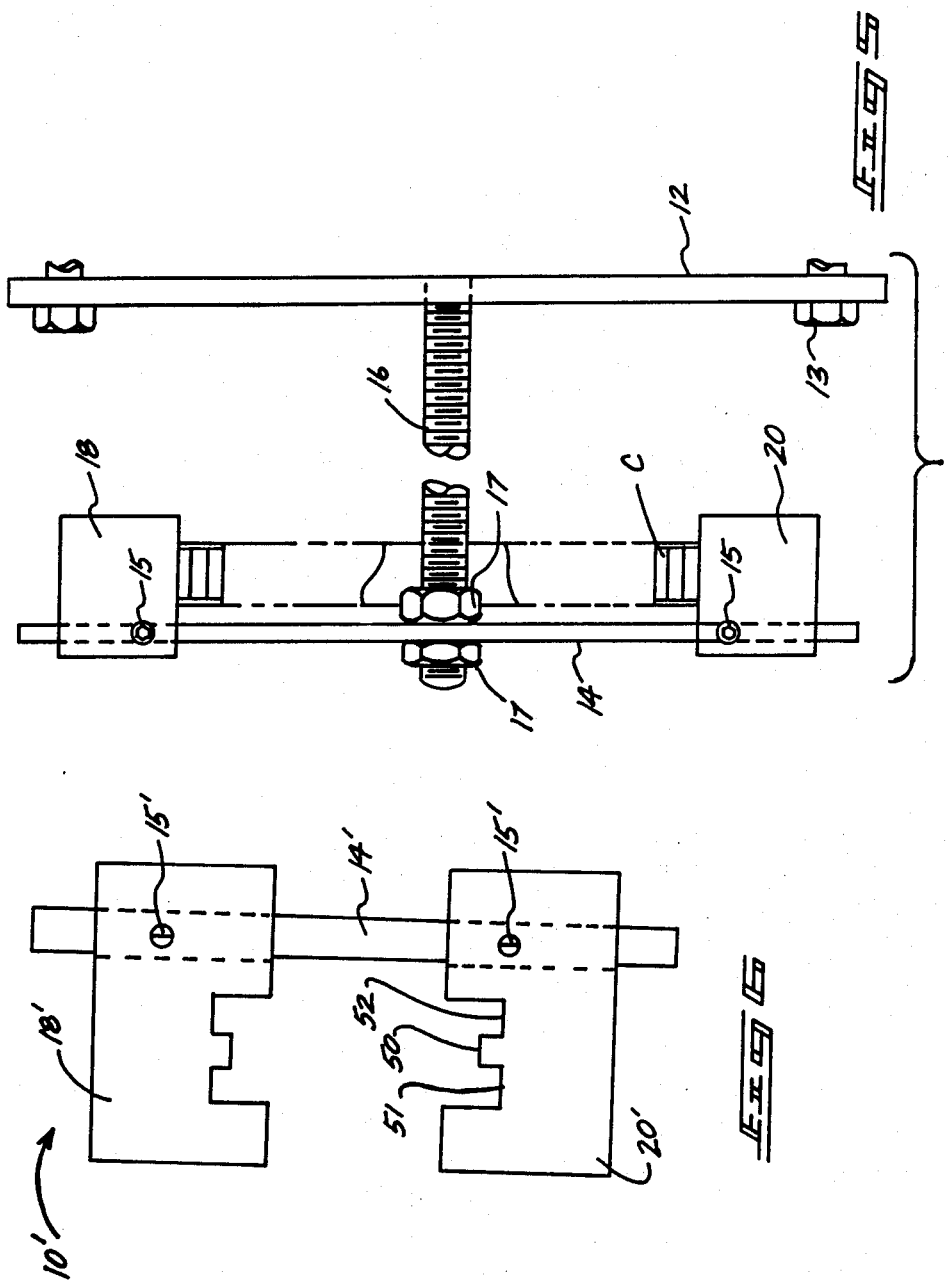

CHAIN TENSIONING DEVICE

BACKGROUND OF THE INVENTION

1. Field of the Invention

The present invention relates to chain tensioning devices, and more particularly pertains to chain tensioning device for use in tensioning endless loop sprocket driven chains. Frequently, in industrial machinery, chains in chain drive systems become loose due to stretching of the chains. In order to compensate for the stretching, the chains must be tensioned. Prior art chain tensioning methods include the installation of idler sprockets, which require a mounting surface adjacent the chain drive, or the removal of links from the chain. In many instances, the amount of additional chain tension required is less than that obtained by removing a single chain link. In order to overcome this problem, the present invention provides an inexpensive and easily installed chain tensioning device.

2. Description of the Prior Art

Various types of chain tensioning devices are known in the prior art. A typical example of such a chain tensioning device is to be found in U.S. Pat. No. 2,766,634, which issued to M. Frank on Oct. 16, 1956. This patent discloses a bumper pad for engagement with an endless loop sprocket driven chain. A synthetic rubber chain engaging pad is mounted on a bracket which requires a mounting surface adjacent the chain to be tensioned. U.S. Pat. No. 3,707,092, which issued to F. Piech on Dec. 26, 1972, discloses a drive chain which is tensioned by rollers and abutment pads. U.S. Pat. No. 4,193,314, which issued to T. Horner et al on Mar. 18, 1980, discloses an engine timing chain snubber which includes a pair of guide shoes supported on the engine block and extending in non deflecting contact with the inner sides of unsupported chain portions between drive and driven sprockets. The guide shoes prevent movement of the chain runs inwardly of their tensioned position and thus prevent chain oscillation or vibration. U.S. Pat. No. 4,492,304, which issued to R. Geis on Jan. 8, 1985, discloses a retainer for preventing a conveyor drive chain from jumping off its sprocket. The retainer comprises a shoe having a lining with an arcuate working surface of anti-friction material disposed over a lower run portion of the chain adjacent a drive sprocket. Coiled springs bias the lining into engagement with the drive chain. U.S. Pat. No. 4,530,681, which issued to N. Kurata et al on July 23, 1985, discloses a mechanism for tensioning a motorcyle engine cam chain. The mechanism includes a guide on the slack side of the chain which is controlled by two spaced pivotally mounted links. One of the two links is biased by a spring to tension the cam chain.

While the above mentioned devices are suited for their intended usage, none of these devices disclose a mechanism which may be easily and quickly installed on an existing endless belt chain without requiring attachment to any adjacent supporting surfaces. Additionally, none of the aforesaid devices disclose the use of a chain tensioning device which includes an automatic chain oiler. Inasmuch as the art is relatively crowded with respect of these various types of chain tensioning devices, it can be appreciated that there is a continuing need for and interest in improvements to such chain tensioning devices, and in this respect, the present invention addresses this need and interest.

SUMMARY OF THE INVENTION

In view of the foregoing disadvantages inherent in the known types of chain tensioning devices now present in the prior art, the present invention provides an improved chain tensioning device. As such, the general purpose of the present invention, which will be described subsequently in greater detail, is to provide a new and improved chain tensioning device which has all the advantages of the prior art chain tensioning devices and none of the disadvantages.

To attain this, representative embodiments of the concepts of the present invention are illustrated in the drawings and make use of a pair of spaced blocks having opposed surfaces configured for abutment with a chain. An elongated connecting bar extends between the blocks and through aligned apertures formed through each of the blocks. The blocks are independently adjustably secured along the length of the connecting bar by set screws. The opposed chain abutment surfaces are configured as mirror image rectangular channel tracks having a central projection. In use, the device is placed in engagement with an endless loop type sprocket driven chain and the blocks are adjustably positioned along the length of the connecting bar with the rectangular channel tracks in engagement with opposite sides of the endless chain loop. The device provides a simple and inexpensive mechanism for tensioning a chain in the absence of a supporting structure for mounting an additional idler sprocket. An automatic chain oiling mechanism may be attached to one of the blocks for continuously dispensing small quantities of lubricant on the chain. The chain oiling mechanism includes a support link secured to one of the blocks, a gear rotatably mounted on the support link, an oil reservoir mounted on an end of the support link, an output nozzle on the reservoir, and a valve actuated upon rotation of the gear through engagement with the chain for opening the output nozzle.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor it is intended to be limiting as to the scope of the invention in any way.

It is therefore an object of the present invention to provide a new and improved chain tensioning device which has all the advantages of the prior art chain tensioning devices and none of the disadvantages.

It is another object of the present invention to provide a new and improved chain tensioning device which may be easily and efficiently manufactured and marketed.

It is a further object of the present invention to provide a new and improved chain tensioning device which is of a durable and reliable construction.

An even further object of the present invention is to provide a new and improved chain tensioning device which is susceptible of a low cost of manufacture with regard to both materials and labor, and which accordingly is then susceptible of low prices of sale to the consuming public, thereby making such chain tensioning devices economically available to the buying public.

Still yet another object of the present invention is to provide a new and improved chain tensioning device which provides in the apparatuses and methods of the prior art some of the advantages thereof, while simultaneously overcoming some of the disadvantages normally associated therewith.

Still another object of the present invention is to provide a new and improved chain tensioning device for tensioning endless loop sprocket driven chains.

Yet another object of the present invention is to provide a new and improved chain tensioning device which may be quickly and easily installed on existing chain drive systems, without requiring attachment to any adjacent supporting surface.

Even still another object of the present invention is to provide a new and improved chain tensioning device which includes an automatic chain oiling mechanism.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of a first embodiment of the present invention which includes an automatic chain oiling device.

FIG. 2 is a partially cut away view, taken along line 2—2 of FIG. 1.

FIG. 3 is a partial cross-sectional view, taken along line 3—3 of FIG. 2, illustrating the chain oiling lubricant reservoir.

FIG. 4 is a partial cross sectional view, taken along line 4—4 of FIG. 2, illustrating the construction of the chain oiler attachment link.

FIG. 5 is a cross sectional view, taken along line 5—5 of FIG. 1.

FIG. 6 is a side view which illustrates the chain tensioning device according to a second embodiment of the present invention.

DESCRIPTION OF THE PREFERRED EMBODIMENT

With reference now to the drawings, and in particular to FIG. 1 thereof, a new and improved chain tensioning device embodying the principles and concepts of the present invention and generally designated by the reference numeral 10 will be described.

More specifically, it will be noted that the first embodiment 10 of the invention includes a base 12 having a plurality of threaded fasteners 13 for securement to a supporting surface W. A connecting bar 14 is secured to the base 12 by a perpendicularly extending externally threaded mounting standard 16 and an internally threaded nut 17. A pair of spaced blocks 18 and 20 are secured in independently adjustable locations along the connecting bar 14. The blocks 18 and 20 have aligned apertures through which the connecting bar 14 extends. The blocks 18 and 20 may be secured in a desired position through the use of conventional set screws. A conventional endless loop type chain C extends around conventional toothed sprockets S which are mounted for rotation on axles A. Such chain drive systems are utilized in a wide variety of applications in many different industries. In use, the base 12 is secured on an adjacent supporting surface W through the use of fasteners such as bolts 13 and the position of the connecting bar 14 is adjusted along the length of the mounting standard 16. The blocks 18 and 20 are then adjusted into engagement with opposite sides of the chain C, to provide a suitable tension. The set screws securing the blocks 18 and 20 on the connecting bar 14 are then tightened. The blocks 18 and 20 are preferably formed from a low friction material, for example, the plastic marketed under the name DERLIN. An optional automatic chain oiling device may be mounted by a support link 22 to the block 18. A gear 28 is rotatably mounted on the support link 22 by an axle 26, and is positioned to engage the chain C. A lubricant reservoir 30 having a removable cap 32 is mounted adjacent an end of the support link 22 and has a reservoir 34 for dispensing small quantities of lubricant on the chain C. Rotation of the gear 28 by the chain C causes a valve within the reservoir 30 to be sequentially opened and closed, thus allowing lubricant to flow by gravity through the outlet nozzle 34.

FIG. 2 provides a top view, partially cut away, taken along line 2—2 of FIG. 1. The support link 22 has a generally U-shaped configuration, with an end leg 24 extending through a transverse aperture in the block 18. The axle 26 extends between parallel links 22 and supports gear 28 for rotation. The set screw 15 which screws the block 18 in an adjusted position along the length of the connecting bar 14 is illustrated in a cut away view. The distance between the base 12 and the connecting bar 14 may be adjusted by virtue of the threaded mounting standard 16.

As shown in the partially cut away cross sectional view of FIG. 3, the teeth of the gear 28 engage a striker plate 40 connected to a valve stem 42 and a ball valve 44. A coil spring 46 biases the valve 44, valve stem 42 and striker plate 40 to an outward position, to the right as illustrated in FIG. 3. A stepped bore configuration 36 and 38 receives the striker plate 40 and return spring 46, which is captured by a retaining flange 48. The valve 44 is movable between the illustrated open position, in which lubricant L is free to flow by gravity through the outlet nozzle 34, and a closed position in which the valve 44 engages in a complementary formed valve seat to close the output nozzle 34. It is pointed out that the output nozzle 34 may be formed in any desired dimension to regulate the quantity of lubricant dispensed upon engagement of the striker plate 40 with each of the teeth of the gear 28. Similarly, the number of teeth on the gear 28 may be increased or decreased to vary the amount of dispensed lubricant.

FIG. 4 provides a cross sectional view, taken along line 4—4 of FIG. 2, which further illustrates the constructional details of the automatic oiler support linkage in relation to the block 18.

FIG. 5 provides a cross sectional view, taken along line 5—5 of FIG. 1, which illustrates the blocks 18 and 20, which have opposed surfaces in engagement with opposite sides of the endless belt type chain C. As previously described, the position of the connecting bar 14 with respect to the base 12 may be adjusted along the threaded mounting standard 16 by virtue of the conventional nuts 17. The set screws 15 which secure the blocks 18 and 20 in independently adjusted positions along the length of the connecting bar 14 are illustrated.

FIG. 6 provides a side view which illustrates a second embodiment 10' of the present invention. A pair of generally rectangular blocks 18' and 20' are secured in spaced relation on a connecting bar 14', which extends through aligned apertures formed through the blocks 18' and 20'. Set screws 15' secure the blocks 18' and 20' in independently adjusted positions along the length of the connecting bar 14'. The blocks 18' and 20' are formed with a rectangular channel track having a central rectangular ridge or projection 50. The projection 50 divides the rectangular channel track into spaced channel portions 51 and 52. The tracks 51, 52 and projection 50 may be suitably dimensioned for use with a wide variety of different standard chain dimensions. The chain engaging opposed surfaces of the blocks 18' and 20' are formed in mirror image relation, and are adapted for engagement with opposite sides of a conventional endless loop chain. In use, the blocks 18' and 20' are placed into endless with opposite sides of an endless loop chain, and adjusted to provide the desired chain tension by selecting the appropriate positioning along the connecting bar 14'. Set screws 15' are then tightened, securing the device on the endless loop chain. The chain tensioning device 10' of the second embodiment of the present invention rides on, and is directly supported by the chain, and thus requires no additional brackets or adjacent mounting surfaces. The low friction material (DERLIN) use in the construction on the blocks 18' and 20' ensures a minimum of resistance. It should be understood that the automatic chain oiling device described in detail with reference to the first embodiment of the present invention may be applied in an identical fashion with the second embodiment 10' by securement to one of the blocks 18'πor 20'.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A chain tensioning device, comprising:
   a pair of spaced blocks;
   said blocks having opposed surfaces configured for abutment with opposite sides of an endless loop chain;
   aligned apertures formed through each of said blocks;
   an elongated connecting bar extending between said blocks and through said aligned apertures;
   means for independently adjustably securing each of said blocks along the length of said connecting bar;
   a mounting standard perpendicularly attached at a central portion of said connecting bar;
   a base connected to said mounting standard;
   means for securing said base adjacent a chain to be tensioned.
   a support link secured to one of said blocks;
   a gear rotatably mounted on said link;
   an oil reservoir on said link;
   an output nozzle on said reservoir; and
   valve means actuated upon rotation of said gear for opening and closing said output nozzle to lubricate a chain.

2. The chain tensioning device of claim 1, wherein each of said opposed surfaces comprises a rectangular channel track having a central projection.

3. The chain tensioning device of claim 2, wherein said opposed surfaces are mirror images.

4. A chain tensioning device, comprising:
   a pair of spaced blocks;
   said blocks having opposed surfaces configured for abutment with opposite sides of an endless loop chain;
   aligned apertures formed through each of said blocks;
   an elongated connected bar extending between said blocks and through said aligned apertures;
   means for independently adjustably securing each of said blocks along the length of said connecting bar;
   a support link secured to one of said blocks;
   a gear rotatably mounted on said link;
   an oil reservoir on said link;
   an output nozzle on said reservoir; and
   valve means actuated upon rotation of said gear for opening and closing said output nozzle to lubricate a chain.

5. The chain tensioning device of claim 4, wherein each of said opposed surfaces comprises a rectangular channel track having a central projection.

6. The chain tensioning device of claim 5, wherein said opposed surfaces are mirror images.

* * * * *